(12) United States Patent
Tsukihara et al.

(10) Patent No.: US 10,981,235 B2
(45) Date of Patent: Apr. 20, 2021

(54) ROTARY CUTTING TOOL AND METHOD OF MANUFACTURING THE SAME

(71) Applicant: Sumitomo Electric Hardmetal Corp., Itami (JP)

(72) Inventors: Nozomi Tsukihara, Itami (JP); Yutaka Kobayashi, Itami (JP); Katsuo Kazahaya, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 16/331,923

(22) PCT Filed: May 9, 2018

(86) PCT No.: PCT/JP2018/017873
§ 371 (c)(1),
(2) Date: Mar. 8, 2019

(87) PCT Pub. No.: WO2019/039001
PCT Pub. Date: Feb. 28, 2019

(65) Prior Publication Data
US 2019/0201985 A1      Jul. 4, 2019

(30) Foreign Application Priority Data
Aug. 22, 2017   (JP) .............................. JP2017-159278

(51) Int. Cl.
*B23B 51/02*     (2006.01)

(52) U.S. Cl.
CPC .......... *B23B 51/02* (2013.01); *B23B 2226/31* (2013.01); *B23B 2228/04* (2013.01); *B23B 2228/08* (2013.01); *B23B 2228/10* (2013.01)

(58) Field of Classification Search
CPC ... B23B 51/00; B23B 51/02; B23B 2228/105; B23C 5/10; B23C 2226/315; B23C 2226/31; B23C 5/1009; B23D 77/00; B23D 2277/2407; B23D 2227/2414; B23D 2227/2442; B23D 2227/245; C23C 16/27
See application file for complete search history.

(56) References Cited

U.S. PATENT DOCUMENTS

| | | | |
|---|---|---|---|
| 5,354,155 A | 10/1994 | Adams | |
| 6,196,908 B1 * | 3/2001 | Adams | ..................... B24D 7/18 408/145 |

(Continued)

FOREIGN PATENT DOCUMENTS

| | | |
|---|---|---|
| JP | H06-075612 U | 10/1994 |
| JP | H08-174309 A | 7/1996 |

(Continued)

*Primary Examiner* — Chwen-Wei Su
(74) *Attorney, Agent, or Firm* — Baker Botts L.L.P.; Michael A. Sartori

(57) ABSTRACT

A rotary cutting tool includes a base material, a first diamond layer, and a second diamond layer. The base material includes a head portion, a body portion, and a shoulder portion defining a boundary portion between the head portion and the body portion. The first diamond layer covers the body portion and the shoulder portion and exposes the head portion. The second diamond layer covers the head portion, is provided on the first diamond layer in the shoulder portion, and does not cover the body portion.

5 Claims, 13 Drawing Sheets

(56) References Cited

U.S. PATENT DOCUMENTS

| | | | | |
|---|---|---|---|---|
| 7,204,664 | B2 * | 4/2007 | Nakanishi | B24D 7/14 |
| | | | | 408/1 R |
| 7,575,401 | B1 * | 8/2009 | Garrick | B23B 51/02 |
| | | | | 408/145 |
| 2013/0121778 | A1 | 5/2013 | Kauper | |
| 2016/0228954 | A1 | 8/2016 | Lemmer et al. | |
| 2016/0243625 | A1 | 8/2016 | Waki et al. | |
| 2017/0106454 | A1 * | 4/2017 | Matsuo | B23B 51/06 |

FOREIGN PATENT DOCUMENTS

| | | | | |
|---|---|---|---|---|
| JP | H08-311652 A | | 11/1996 | |
| JP | 2007245270 A | * | 9/2007 | |
| KR | 10-2016-0042049 A | | 4/2016 | |
| WO | WO-2015147264 A1 | * | 10/2015 | B23B 51/02 |
| WO | WO-2018061355 A1 | * | 4/2018 | B23B 27/20 |

\* cited by examiner

ROTARY CUTTING TOOL AND METHOD OF MANUFACTURING THE SAME

TECHNICAL FIELD

The present invention relates to a rotary cutting tool and a method of manufacturing the same. The present application claims the priority benefit of Japanese Patent Application No. 2017-159278 filed on Aug. 22, 2017, the contents of which are incorporated herein by reference in its entirety.

BACKGROUND ART

Japanese Utility Model Laying-Open No. 06-75612 describes a double angle drill. This double angle drill has a spiral flute for discharging chips which is formed from its tip to the vicinity of a shank. The tip is formed of a primary cutting edge and a secondary cutting edge having a point angle smaller than that of the primary cutting edge. The tip is coated with a diamond film.

CITATION LIST

Patent Literature

PTL 1: Japanese Utility Model Laying-Open. No. 06-75612

SUMMARY OF INVENTION

A rotary cutting tool according to an embodiment of the present invention includes a base material, a first diamond layer, and a second diamond layer. The base material includes a head portion, a body portion, and a shoulder portion defining a boundary portion between the head portion and the body portion. The first diamond layer covers the body portion and the shoulder portion and exposes the head portion. The second diamond layer covers the head portion, is provided on the first diamond layer in the shoulder portion, and does not cover the body portion.

DETAILED DESCRIPTION

Figure 1:
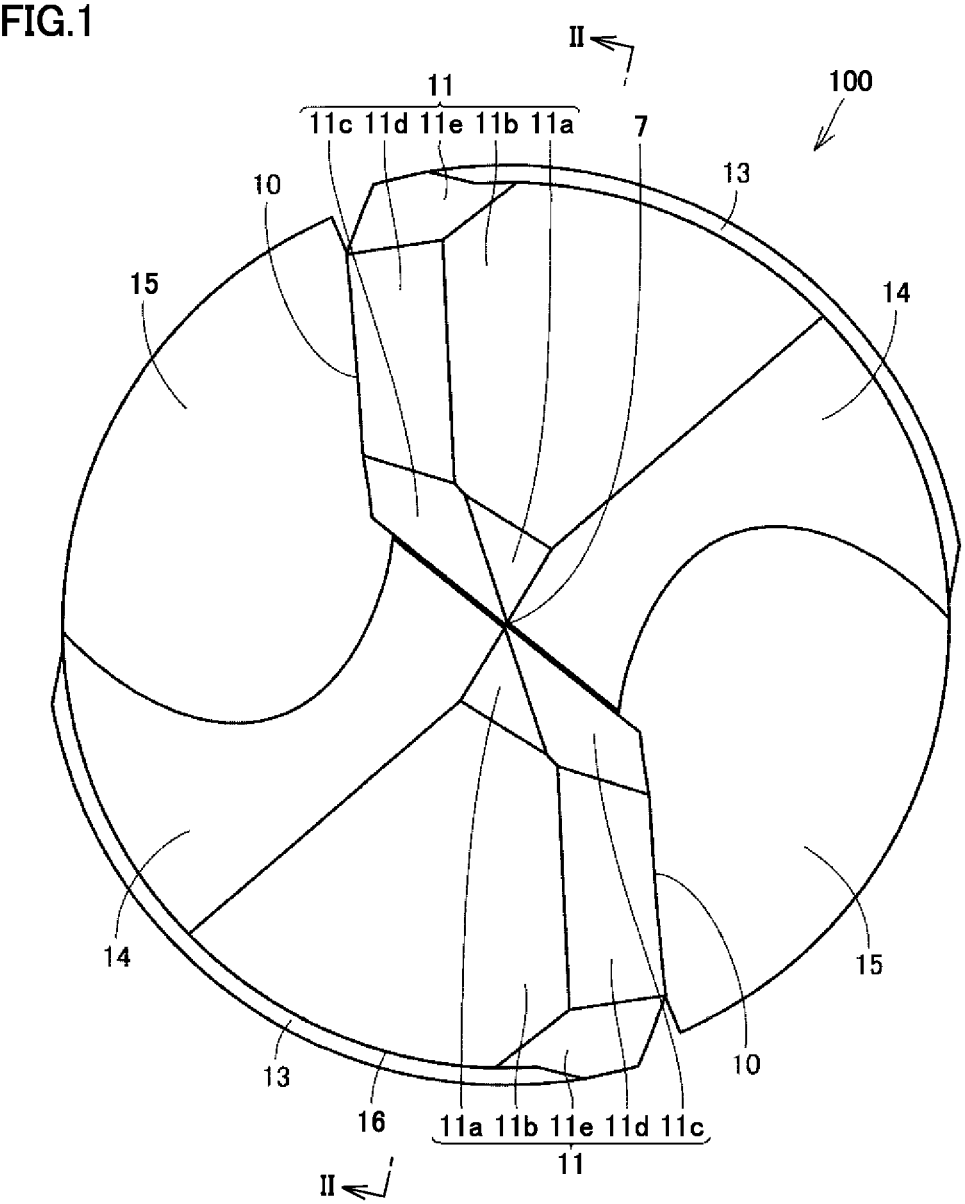
FIG. 1 is a schematic plan view showing a configuration of a rotary cutting tool according to Embodiment 1.

Problem to be Solved by the Present Disclosure

In the double angle drill, a high load is applied to the shoulder portion during a rotary cutting process, which may chip the shoulder portion.

An aspect of the present invention has been made to solve the above problem, and an object thereof is to provide a rotary cutting tool capable of reducing chipping of a shoulder portion and a method of manufacturing the same.

Advantageous Effect of the Present Disclosure

The aspect of the present invention can provide a rotary cutting tool capable of reducing chipping of a shoulder portion and a method of manufacturing the same.

DESCRIPTION OF EMBODIMENTS

A summary of embodiments of the present invention will now be described.

(1) A rotary cutting tool 100 according to an aspect of the present invention includes a base material 5, a first diamond layer 1, and a second diamond layer 2. Base material 5 includes a head portion 4, a body portion 3, and a shoulder portion 16 defining a boundary portion between head portion 4 and body portion 3. First diamond layer 1 covers body portion 3 and shoulder portion 16 and exposes head portion 4. Second diamond layer 2 covers head portion 4, is provided on first diamond layer 1 in shoulder portion 16, and does not cover body portion 3.

In rotary cutting with the rotary cutting tool, load becomes higher in shoulder portion 16 defining the boundary portion between head portion 4 and body portion 3. In rotary cutting tool 100 according to (1) above, first diamond layer 1 and second diamond layer 2 are formed near shoulder portion 16, leading to a greater total thickness of the diamond layers. This improves the strength near shoulder portion 16 and also improves wear resistance. Consequently, chipping of shoulder portion 16 can be reduced.

(2) In rotary cutting tool 100 according to (1) above, head portion 4 may have a flank face 11. Second diamond layer 2 may cover flank face 11. This can improve the slidability of flank face 11.

(3) In rotary cutting tool 100 according to (1) or (2) above, body portion 3 may have a peripheral surface 13 having a spiral shape. First diamond layer 1 may cover peripheral surface 13. This can improve the slidability of peripheral surface 13.

(4) In rotary cutting tool 100 according to any one of (1) to (3) above, the rotary cutting tool may be a drill.

(5) In rotary cutting tool 100 according to any one of (1) to (3) above, the rotary cutting tool may be an end mill.

(6) A method of manufacturing rotary cutting tool 100 according to an aspect of the present invention has the following steps. Base material 5 with first diamond layer 1 formed thereon is prepared, where diamond layer 1 exposes head portion 4 and covers body portion 3 and shoulder portion 16. Subsequent to the preparing of base material 5, second diamond layer 2 that covers head portion 4, overlaps first diamond layer 1 in shoulder portion 16, and does not cover body portion 3 is formed. Consequently, first diamond layer 1 and second diamond layer are formed in shoulder portion 16, leading to a greater total thickness of the diamond layers. This improves the strength in shoulder portion 16 and also improves wear resistance. Consequently, chipping of shoulder portion 16 can be reduced.

(7) In the method of manufacturing rotary cutting tool 100 according to (6) above, the preparing of base material 5 may include the following steps. A rotary cutting tool including first diamond layer 1 covering each of head portion 4, shoulder portion 16, and body portion 3 is prepared. First diamond layer 1 is removed in head portion 4 while leaving first diamond layer 1 covering body portion 3 and shoulder portion 16. Consequently, a time for removing a film can be reduced more than the case in which first diamond layer 1 is removed in both of body portion 3 and head portion 4.

(8) In the method of manufacturing rotary cutting tool 100 according to (7) above, the preparing of base material 5 may further include polishing head portion 4, subsequent to the removing of first diamond layer 1. This can recover the sharpness of a cutting edge. Consequently, the rotary cutting tool can be recycled.

(9) In the method of manufacturing rotary cutting tool 100 according to (8) above, the preparing of base material 5 may further include subjecting head portion 4 to acid treatment, subsequent to the polishing of head portion 4. Body portion 3 is protected by first diamond layer 1. This can reduce the elusion of cobalt from body portion 3 in the subjecting of head portion 4 to acid treatment. Consequently, the degradation of body portion 3 can be reduced.

DESCRIPTION OF EMBODIMENTS

Embodiments of the present invention will now be described in detail with reference to the drawings. It should be noted that in the following drawings, the same or corresponding parts are denoted by the same reference numerals, and the description thereof will not be repeated. Also, at least some of embodiments described below may be combined appropriately.

Embodiment 1

Figure 2:
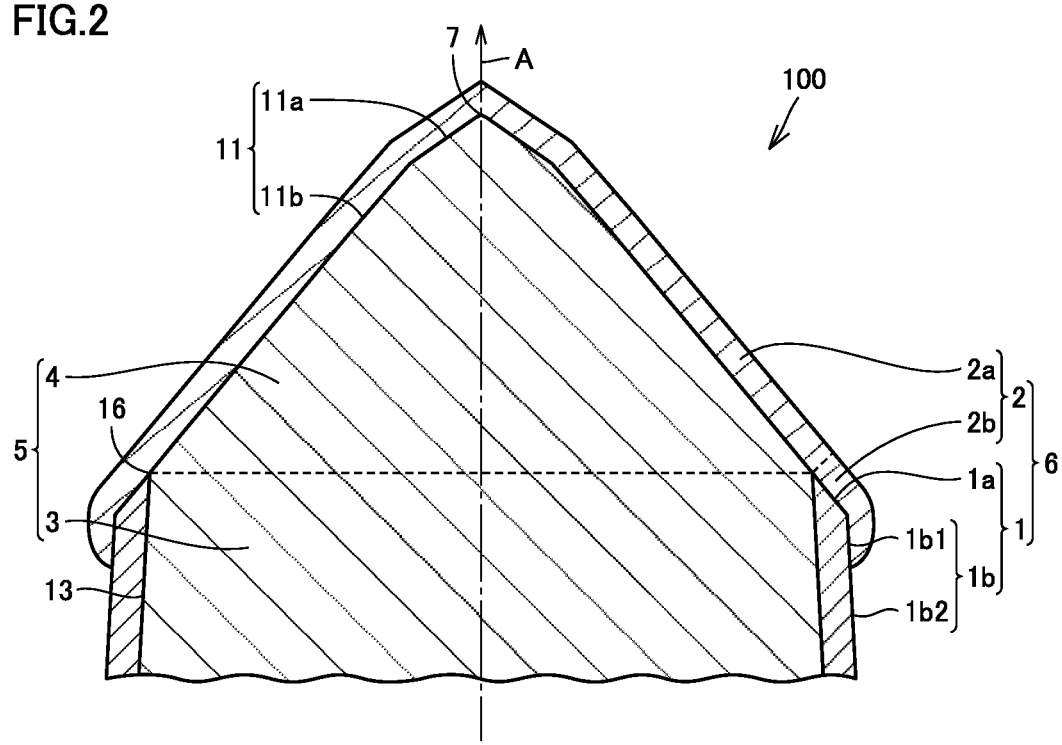
FIG. 2 is a schematic sectional view taken along line II-II in FIG. 1.
Figure 3:
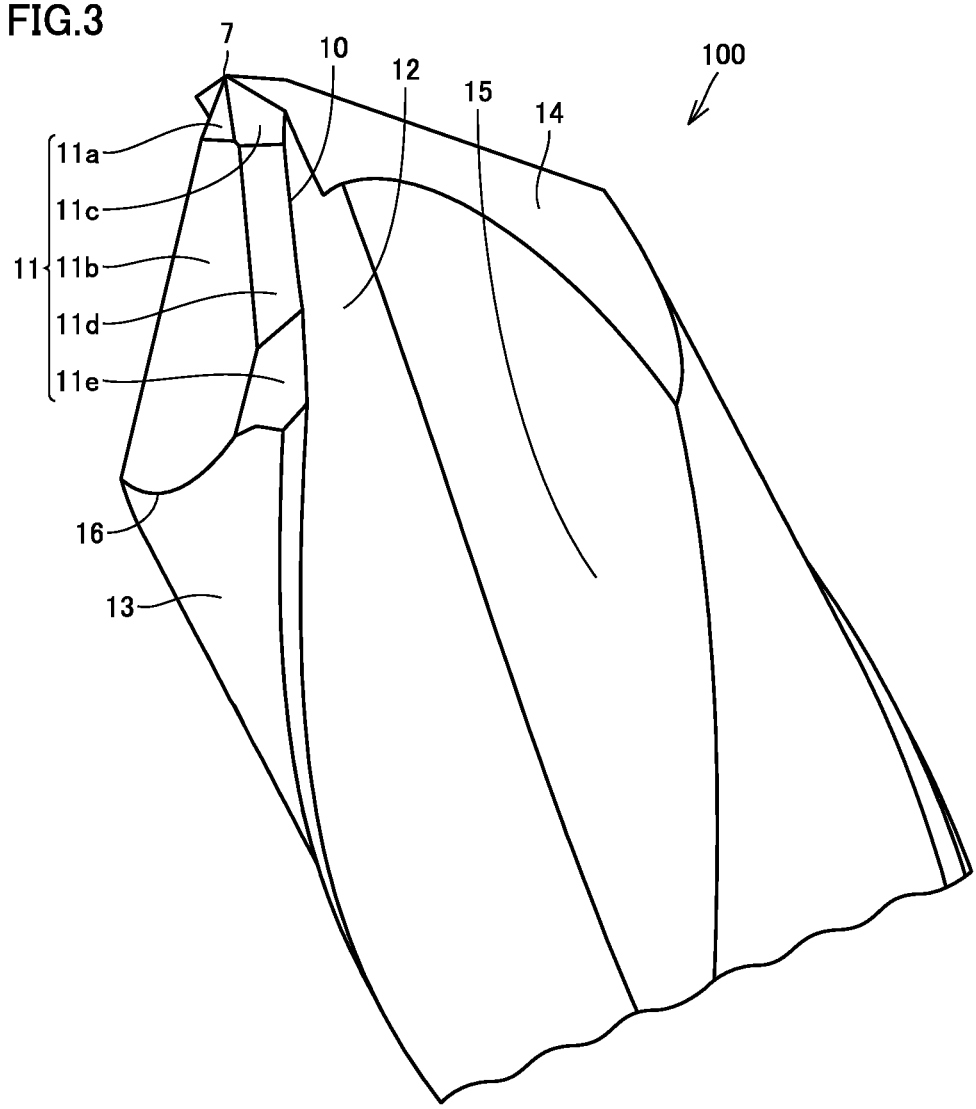
FIG. 3 is a schematic perspective view showing a configuration of the rotary cutting tool according to Embodiment 1.

First, a configuration of a rotary cutting tool 100 according to Embodiment 1 will be described. FIG. 1 is a schematic plan view showing a configuration of a rotary cutting tool according to Embodiment 1. FIG. 2 is a schematic sectional view taken along line II-II in FIG. 1. FIG. 3 is a schematic perspective view showing a configuration of the rotary cutting tool according to Embodiment 1.

As shown in FIGS. 1, 2, and 3, rotary cutting tool 100 according to Embodiment 1 is, for example, a drill for use in processing of carbon fiber reinforced plastic (CFRP). Rotary cutting tool 100 can rotate around, for example, a central axis A. Rotary cutting tool 100 includes a rake face 12, a flank face 11, a peripheral surface 13, a heel face 14, and a groove face 15. Flank face 11 is continuous with rake face 12. Peripheral surface 13 is continuous with flank face 11. Peripheral surface 13 has, for example, a spiral shape. Heel face 14 is continuous with flank face 11. Heel face 14 is located rearward of flank face 11 in the direction of rotation. Groove face 15 is continuous with rake face 12. A ridge line between rake face 12 and flank face 11 defines a cutting edge 10.

As shown in FIG. 1, flank face 11 may have a first flank face portion 11a, a second flank face portion 11b, a third flank face portion 11c, a fourth flank face portion 11d, and a fifth flank face portion 11e. First flank face portion 11a and third flank face portion 11c are continuous with a tip 7. First flank face portion 11a is continuous with third flank face portion 11c. First flank face portion 11a is located rearward of third flank face portion 11c in the direction of rotation. Second flank face portion 11b is located on the outer peripheral side with respect to first flank face portion 11a. Fourth flank face portion 11d is located on the outer peripheral side with respect to third flank face portion 11c. Fifth flank face portion 11e is located on the outer peripheral side with respect to fourth flank face portion 11d. Second flank face portion 11b is continuous with fourth flank face portion 11d. Second flank face portion 11b is located rearward of fourth flank face portion 11d in the direction of rotation. Fifth flank face portion 11e is continuous with both of second flank face portion 11b and fourth flank face portion 11d. Second flank face portion 11b is located rearward of fifth flank face portion 11e in the direction of rotation. A ridge line between rake face 12 and each of third flank face portion 11c, fourth flank face portion 11d, and fifth flank face portion 11e may define cutting edge 10.

As shown in FIG. 2, rotary cutting tool 100 mainly includes a base material 5 and a diamond layer 6. Diamond layer 6 mainly has a first diamond layer 1 and a second diamond layer 2. The material for base material 5 is, for example, cemented carbide containing powdered tungsten carbide (WC) and a binder of, for example, cobalt (Co). Base material 5 is not limited to cemented carbide and may be, for example, cermet or ceramic. First diamond layer 1 and second diamond layer 2 are layers containing, for example, diamond crystal. First diamond layer 1 and second diamond layer 2 may be, for example, polycrystalline diamond. First diamond layer 1 and second diamond layer 2 have a thickness of, for example, 4 µm or more and 20 µm or less. First diamond layer 1 may be identical to or different from second diamond layer 2 in particle size, thickness, or the like.

Base material 5 mainly includes a head portion 4, a body portion 3, and a shoulder portion 16. Head portion 4 is a portion located at the tip of rotary cutting tool 100. Head portion 4 has a shape with a diameter changing in the direction of the axis of rotation (i.e., central axis A) of rotary cutting tool 100. Head portion 4 has, for example, a conical shape or hemispherical shape. Head portion 4 is located forward in the direction parallel to central axis A. "Forward" is, for example, the feed direction. Head portion 4 is a portion opposite to the shank in the direction parallel to central axis A. Head portion 4 may be a portion that first contacts a workpiece in a cutting process.

Body portion 3 is a portion positioned at the proximal end of rotary cutting tool 100. Body portion 3 has a shape with a diameter changing little in the direction of the axis of rotation of rotary cutting tool 100. Specifically, the rate of change in the diameter of body portion 3 is smaller than the rate of change in the diameter of head portion 4 in the direction of the axis of rotation. Body portion 3 has, for example, a cylindrical shape. Body portion 3 is continuous with, for example, head portion 4. Body portion 3 is located on the shank side with respect to head portion 4 in the direction parallel to central axis A. Shoulder portion 16 is a portion defining the boundary portion between head portion 4 and body portion 3. Shoulder portion 16 is a portion in which the "shape with a diameter changing" transitions to the "shape with a diameter changing little" in the direction of the axis of rotation of rotary cutting tool 100. More specific definition of shoulder portion 16 will be described below.

As shown in FIG. 2, in the cross section including central axis A, the width of head portion 4 in the direction perpendicular to central axis A may increase from tip 7 backward in central axis A. The width of body portion 3 in the direction perpendicular to central axis A may be constant or increase backward in central axis A. As shown in FIG. 2, head portion 4 has, for example, flank face 11. Flank face 11 has, for example, first flank face portion 11a and second flank face portion 11b. In the cross section including central axis A, an angle of first flank face portion 11a to central axis A may be greater than an angle of second flank face portion 11b to central axis A. Body portion 3 has, for example, peripheral surface 13. In the cross section including central axis A, an angle of second flank face portion 11b to central axis A may be greater than an angle of peripheral surface 13 to central axis A. As shown in FIG. 2, in the cross section including central axis A, when head portion 4 has a first linear portion (second flank face portion 11b) that is inclined at a first angle to central axis A and body portion 3 has a second linear portion (peripheral surface 13) inclined at a second angle, greater than the first angle, to central axis A or is parallel to central axis A, shoulder portion 16 is a boundary portion between the first linear portion and the second linear portion. Shoulder portion 16 protrudes on, for example, the outer peripheral side.

As shown in FIG. 2, first diamond layer 1 covers body portion 3 and shoulder portion 16 and exposes head portion 4. First diamond layer 1 is in contact with shoulder portion 16. First diamond layer 1 covers, for example, peripheral surface 13 of body portion 3. First diamond layer 1 is apart from, for example, head portion 4. First diamond layer 1 may extend from peripheral surface 13 beyond shoulder portion 16 to be in contact with part of head portion 4. First diamond layer 1 may cover, for example, groove face 15. First diamond layer 1 may have an inclined surface 1a and a flat surface 1b. Inclined surface 1a is inclined to, for example, flat surface 1b. Flat surface 1b may have a first flat surface portion 1b1 and a second flat surface portion 1b2. Inclined surface 1a may be provided along second flank face portion 11b. First diamond layer 1 may be located rearward of shoulder portion 16 in the direction parallel to central axis A.

Second diamond layer 2 covers head portion 4 and is provided on first diamond layer 1 in shoulder portion 16. Second diamond layer 2 does not cover body portion 3. That is to say, it suffices that second diamond layer 2 is not in direct contact with body portion 3 and may cover part of body portion 3 with first diamond layer 1 therebetween. Second diamond layer 2 covers, for example, flank face 11 of head portion 4. Second diamond layer 2 is in contact with part of first diamond layer 1. Second diamond layer 2 has, for example, a first region 2a and a second region 2b. First region 2a is in contact with head portion 4. Second region 2b is located on first diamond layer 1. Second region 2b is in contact with first diamond layer 1. Second region 2b is in contact with inclined surface 1a and first flat surface portion 1b1 of first diamond layer 1. Second region 2b is apart from second flat surface portion 1b2. Second diamond layer 2 may expose first diamond layer 1 in second flat surface portion 1b2.

As shown in FIG. 2, second diamond layer 2 covers, for example, first flank face portion 11a, second flank face portion 11b, and tip 7. Second diamond layer 2 may cover third flank face portion 11c, fourth flank face portion 11d, and fifth flank face portion 11e. Second diamond layer 2 may cover rake face 12, cutting edge 10, and heel face 14. Second diamond layer 2 is in contact with first diamond layer 1 near shoulder portion 16. The portion of first diamond layer 1 which is in contact with second diamond layer 2 may be located rearward of shoulder portion 16 in the direction parallel to central axis A.

A method of manufacturing a rotary cutting tool according to Embodiment 1 will now be described.

Figure 4:
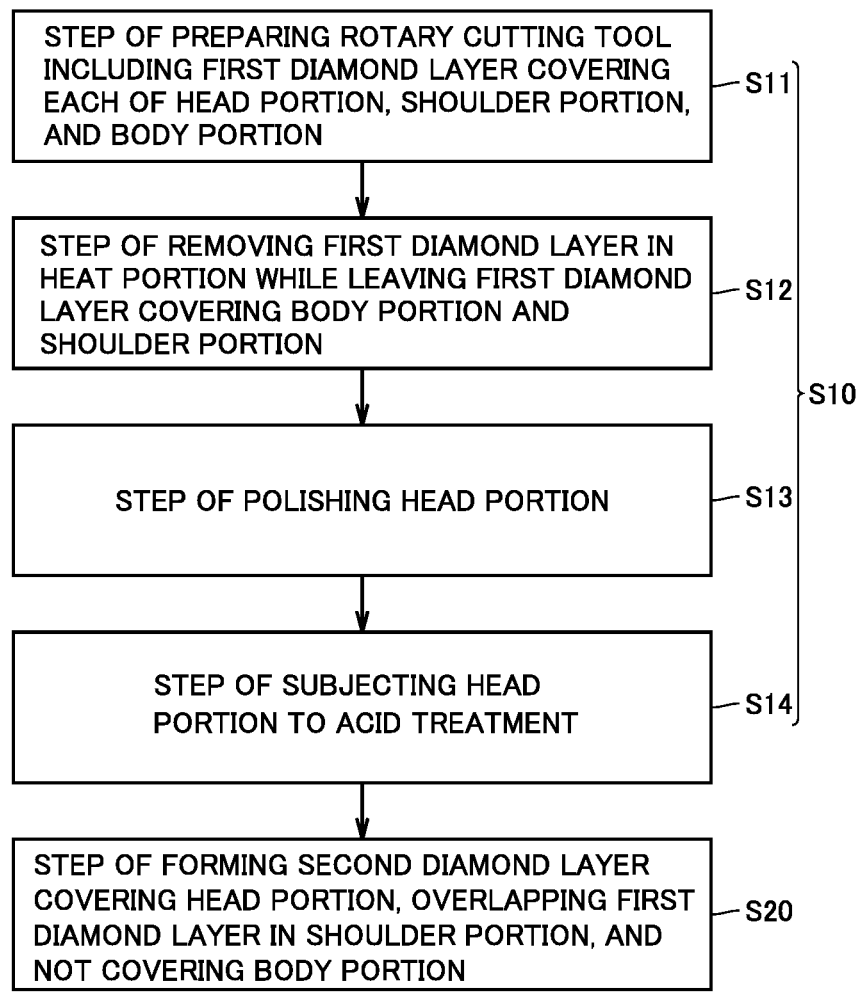
FIG. 4 is a flowchart schematically showing a method of manufacturing a rotary cutting tool according to Embodiment 1.

FIG. 4 is a flowchart schematically illustrating the method of manufacturing a rotary cutting tool according to Embodiment 1. The method of manufacturing a rotary cutting tool according to Embodiment 1 mainly includes the step of preparing a base material with a first diamond layer formed thereon, where the first diamond layer exposes a head portion and covers a body portion and a shoulder portion (S10: FIG. 4), and the step of forming a second diamond layer covering the head portion, overlapping the first diamond layer in the shoulder portion, and not covering body portion 3 (S20: FIG. 4).

[Case where Used Rotary Cutting Tool is Recycled]

First, a method of recycling a used rotary cutting tool will be described. In the recycling method, the step of preparing the base material (S10: FIG. 4) mainly includes the step of preparing a rotary cutting tool including the first diamond layer covering each of the head portion, the shoulder portion, and the body portion (S11: FIG. 4), the step of removing the first diamond layer in the head portion while leaving the first diamond layer covering the body portion and the shoulder portion (S12: FIG. 4), the step of polishing the head portion (S13: FIG. 4), and the step of subjecting the head portion to acid treatment (S14: FIG. 4).

Figure 5:
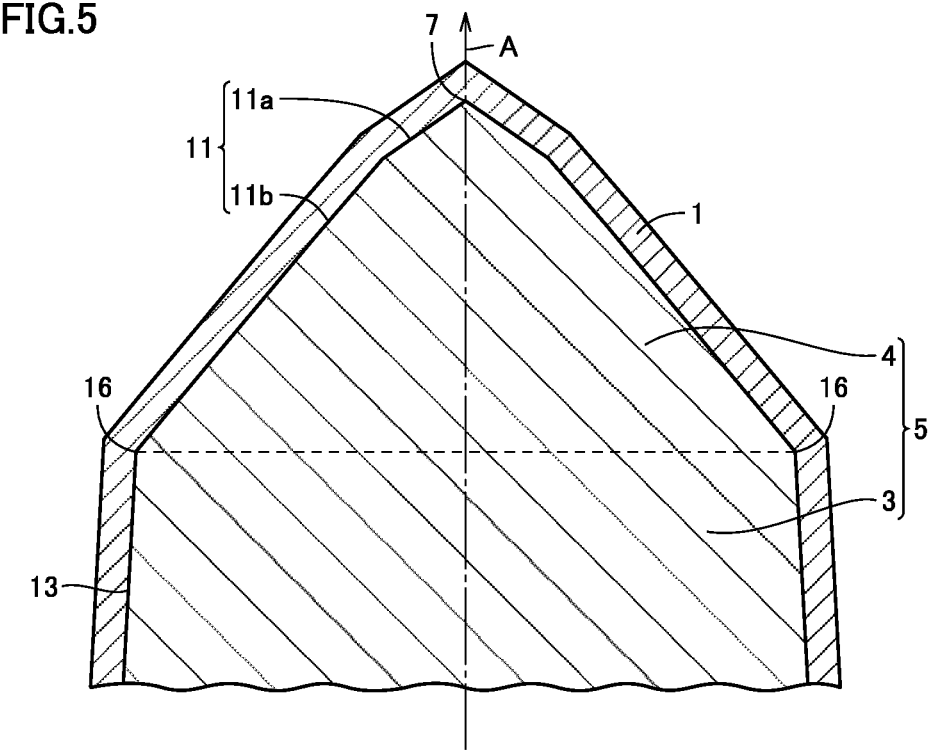
FIG. 5 is a schematic sectional view showing a first step of the method of manufacturing a rotary cutting tool according to Embodiment 1.

FIG. 5 is a schematic sectional view showing a first step of the method of manufacturing a rotary cutting tool according to Embodiment 1. As shown in FIG. 5, in the step of preparing the rotary cutting tool including the first diamond layer covering each of the head portion, the shoulder portion, and the body portion (S11: FIG. 4), a used drill is prepared. The drill has base material 5 and first diamond layer 1. The material for base material 5 is, for example, cemented carbide containing powdered tungsten carbide (WC) and a binder such as cobalt (Co). Base material 5 is not limited to cemented carbide and may be, for example, cermet or ceramic. Base material 5 includes head portion 4, body portion 3, and shoulder portion 16.

First diamond layer 1 is a layer containing, for example, diamond crystal. First diamond layer 1 may be, for example, polycrystalline diamond. First diamond layer 1 may be, for example, a diamond film formed by a chemical vapor deposition (CVD) method or a diamond film formed by a physical vapor deposition (PVD) method. As shown in FIG. 5, first diamond layer 1 covers head portion 4, body portion 3, and shoulder portion 16. Specifically, first diamond layer 1 covers tip 7, flank face 11, and peripheral surface 13. First diamond layer 1 may cover rake face 12, cutting edge 10, heel face 14, and groove face 15.

Figure 6:
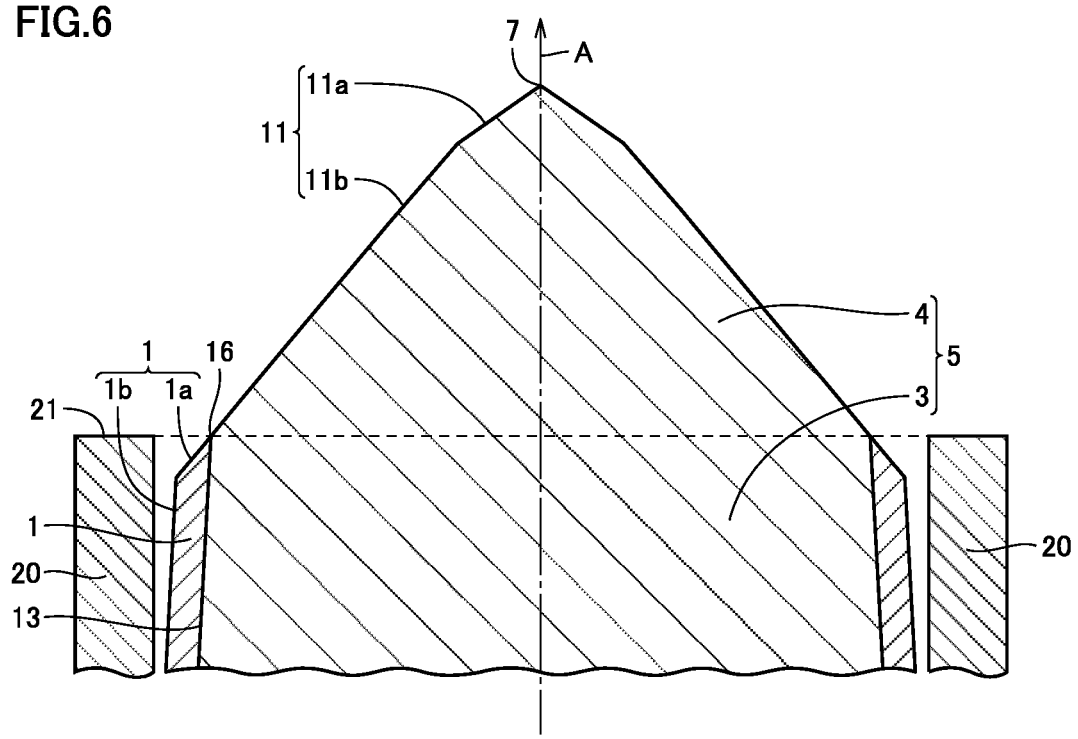
FIG. 6 is a schematic sectional view showing a second step of the method of manufacturing a rotary cutting tool according to Embodiment 1.

FIG. 6 is a schematic sectional view showing a second step of the method of manufacturing a rotary cutting tool according to Embodiment 1. As shown in FIG. 6, in the step of removing the first diamond layer in the head portion while leaving the first diamond layer covering the body portion and the shoulder portion (S12: FIG. 4), a mask member 20 is disposed to surround body portion 3 of the drill. Mask member 20 is, for example, a cylindrical member. The material for mask member 20 is, for example, copper or molybdenum. As shown in FIG. 6, mask member 20 is disposed to expose head portion 4 and cover body portion 3.

Subsequently, part of first diamond layer 1 covering head portion 4 is removed. First diamond layer 1 is removed by, for example, ion etching. Specifically, first diamond layer 1 covering head portion 4 is irradiated with an ion beam by an ion etching apparatus, thus removing part of first diamond layer 1. When first diamond layer 1 is, for example, a diamond film formed by the CVD method, for example, oxygen ion is used as the ion beam. First diamond layer 1 is irradiated with oxygen ion, converting first diamond layer 1 into carbon monoxide or carbon dioxide. Consequently, diamond turns into gas to be removed. When first diamond layer 1 is, for example, a diamond film formed by the PVD method, for example, argon ion is used as the ion beam. Ar bombardment removes part of first diamond layer 1 from head portion 4. Consequently, head portion 4 is exposed from first diamond layer 1 while leaving first diamond layer 1 covering body portion 3 and shoulder portion 16.

Figure 7:
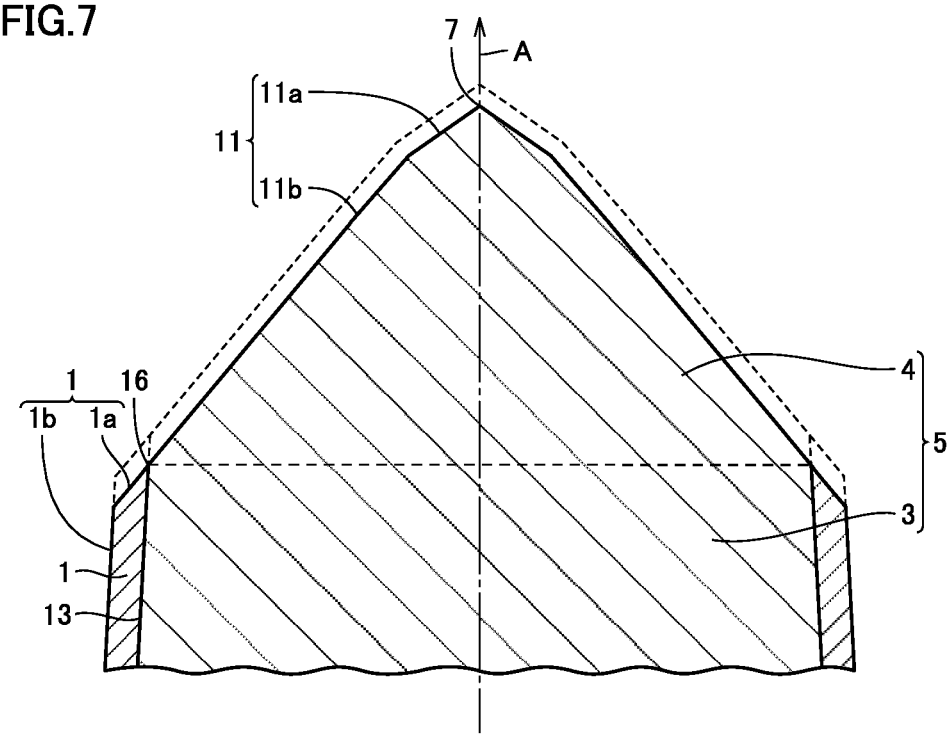
FIG. 7 is a schematic sectional view showing a third step of the method of manufacturing a rotary cutting tool according to Embodiment 1.

FIG. 7 is a schematic sectional view showing a third step of the method of manufacturing a rotary cutting tool according to Embodiment 1. As shown in FIG. 7, in the step of polishing the head portion (S13: FIG. 4), subsequent to the removing of first diamond layer 1, head portion 4 of the drill is polished. Specifically, rake face 12 and flank face 11 of the drill are polished. Consequently, cutting edge 10 defined by rake face 12 and flank face 11 becomes sharp, leading to improved sharpness. Chips adhering to rake face 12 and flank face 11 are removed. In polishing of head portion 4, part of first diamond layer 1 positioned in shoulder portion 16 may be removed together with part of head portion 4.

Subsequently, the step of subjecting the head portion to acid treatment (S14: FIG. 4) is performed. Specifically, subsequent to the polishing of head portion 4, head portion 4 is subjected to acid treatment by, for example, immersing the drill in acid. The acid is, for example, hydrogen peroxide solution ($H_2O_2$), hydrochloric acid (HCl), or nitric acid ($HNO_3$). When the material for base material 5 includes cobalt (Co), cobalt may elute from base material 5 through the acid treatment. In the manufacturing method of the present embodiment, body portion 3 is covered with first diamond layer 1 (see FIG. 7). This can reduce the elution of cobalt from body portion 3.

Figure 8:
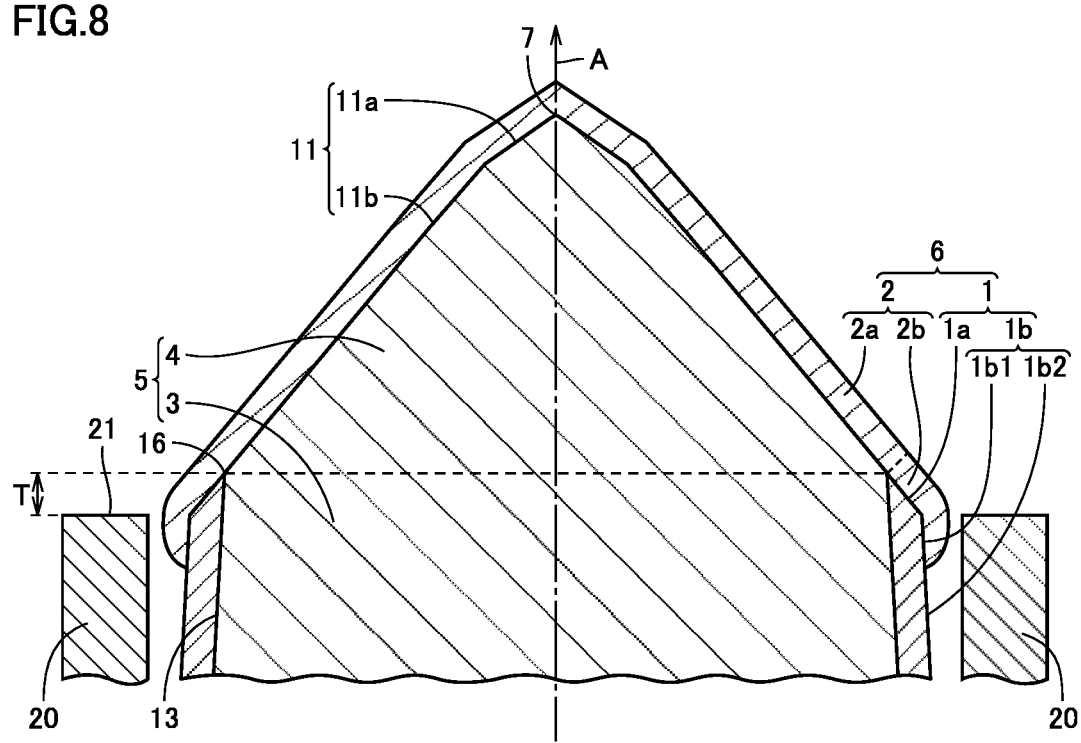
FIG. 8 is a schematic sectional view showing a fourth step of the method of manufacturing a rotary cutting tool according to Embodiment 1.

FIG. 8 is a schematic sectional view showing a fourth step of the method of manufacturing a rotary cutting tool according to Embodiment 1. As shown in FIG. 8, in the step of forming the second diamond layer covering the head portion, overlapping the first diamond layer, and not covering the body portion (S20: FIG. 4), subsequent to the step of performing acid treatment, second diamond layer 2 covering head portion 4 is formed. First, mask member 20 is disposed to cover body portion 3 of the drill. As shown in FIG. 8, mask member 20 is disposed to expose head portion 4 and cover body portion 3. Mask member 20 is disposed such that an end 21 of mask member 20 is located on the shank side with respect to shoulder portion 16 in the direction parallel to central axis A. From another perspective, mask member 20 is disposed such that the end of first diamond layer 1 is exposed from end 21 of mask member 20 as seen from the direction perpendicular to central axis A. As shown in FIG. 8, a distance T between end 21 of mask member 20 and shoulder portion 16 in the direction parallel to central axis A is, for example, 0 mm or more and 3 mm or less.

Subsequently, second diamond layer 2 is formed. Specifically, second diamond layer 2 is deposited by, for example, the CVD method. Second diamond layer 2 covers head portion 4 and is formed on first diamond layer 1. Second diamond layer 2 covers, for example, flank face 11 of head portion 4. Second diamond layer 2 is formed to be in contact with part of first diamond layer 1. Second diamond layer 2 may be formed in contact with inclined surface 1a of first diamond layer 1 and part of flat surface 1b. Part of second diamond layer 2 may come in the space surrounded by mask member 20. Second diamond layer 2 may be deposited by the PVD method or any other method. Consequently, a rotary cutting tool according to Embodiment 1 is completed (see FIG. 1).

[Case where New Rotary Cutting Tool is Manufactured]

Figure 9:
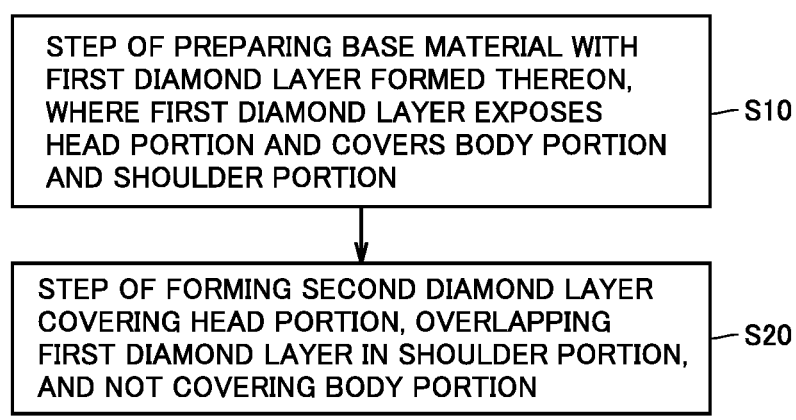
FIG. 9 is a flowchart schematically showing a method of manufacturing a rotary cutting tool according to a modification of Embodiment 1.

FIG. 9 is a flowchart schematically showing a method of manufacturing a rotary cutting tool according to a modification of Embodiment 1. The method of manufacturing a new rotary cutting tool mainly includes the step of preparing a base material with a first diamond layer formed thereon, where the first diamond layer exposes a head portion and covers a body portion and a shoulder portion (S10: FIG. 9), and the step of forming a second diamond layer covering the head portion, overlapping the first diamond layer in the shoulder portion, and not covering the body portion (S20: FIG. 9).

First, base material 5 not covered with a diamond layer is prepared in the step of preparing the base material with the first diamond layer formed thereon, where the first diamond layer exposes the head portion and covers the body portion (S10: FIG. 9). Subsequently, for example, mask member 20 surrounding head portion 4 of base material 5 and exposing body portion 3 is disposed. Subsequently, first diamond layer 1 exposing head portion 4 and covering body portion 3 is formed by, for example, the CVD method. Consequently, base material 5 with first diamond layer 1 formed thereon is prepared, where first diamond layer 1 exposes head portion 4 and covers body portion 3 and shoulder portion 16 (see FIG. 6).

Subsequently, the step of forming the second diamond layer covering the head portion, overlapping the first diamond layer in the shoulder portion, and not covering the body portion (S20: FIG. 9) is performed. Specifically, mask member 20 is disposed to surround body portion 3 of the drill. As shown in FIG. 8, mask member 20 is disposed to expose head portion 4 and cover body portion 3. Mask member 20 is disposed such that end 21 of mask member 20 is located on the shank side with respect to shoulder portion 16 in the direction parallel to central axis A. Subsequently, second diamond layer 2 is formed. Specifically, second diamond layer 2 is deposited by, for example, the CVD method. Second diamond layer 2 covers head portion 4 and is formed on first diamond layer 1 in shoulder portion 16 (see FIG. 8). Consequently, the rotary cutting tool according to Embodiment 1 is completed (see FIG. 1).

The function and effect of the rotary cutting tool according to Embodiment 1 will now be described.

In rotary cutting tool 100 according to Embodiment 1, first diamond layer 1 and second diamond layer 2 are formed near shoulder portion 16, leading to a greater total thickness of the diamond layers. This improves the strength near shoulder portion 16 and also improves wear resistance. Consequently, chipping of shoulder portion 16 can be reduced.

In rotary cutting tool 100 according to Embodiment 1, head portion 4 has flank face 11. Second diamond layer 2 covers flank face 11. This can improve the slidability of flank face 11.

In rotary cutting tool 100 according to Embodiment 1, body portion 3 has peripheral surface 13 having a spiral shape. First diamond layer 1 covers peripheral surface 13. This can improve the slidability of peripheral surface 13.

In the method of manufacturing rotary cutting tool 100 according to Embodiment 1, base material 5 with first diamond layer 1 formed thereon is prepared, where first diamond layer 1 exposes head portion 4 and covers body portion 3 and shoulder portion 16. Subsequent to the preparing of base material 5, second diamond layer 2 covering head portion 4, overlapping first diamond layer 1 in shoulder portion 16, and not covering body portion 3 is formed. This leads to a greater total thickness of the diamond layers near shoulder portion 16. This improves the strength near shoulder portion 16 and also improves wear resistance. Consequently, chipping of shoulder portion 16 can be reduced.

In the method of manufacturing rotary cutting tool 100 according to Embodiment 1, the step of preparing base material 5 includes the following steps. A rotary cutting tool including first diamond layer 1 covering each of head portion 4, shoulder portion 16, and body portion 3 is prepared. First diamond layer 1 is removed in head portion 4 while leaving first diamond layer 1 covering body portion 3 and shoulder portion 16. This reduces a time required for removing the film more than the case where first diamond layer 1 is removed in both of body portion 3 and head portion 4.

In the method of manufacturing rotary cutting tool 100 according to Embodiment 1, the step of preparing base material 5 further includes the step of polishing head portion 4 subsequent to the removing of first diamond layer 1. This can recover the sharpness of the cutting edge. Consequently, the rotary cutting tool can be recycled.

In the method of manufacturing rotary cutting tool 100 according to Embodiment 1, the step of preparing base material 5 further includes the step of subjecting head portion 4 to acid treatment, subsequent to the polishing of head portion 4. Body portion 3 is protected by first diamond layer 1. This can reduce the elution of cobalt from body portion 3 in the step of performing acid treatment. Consequently, the degradation of body portion 3 can be reduced.

Embodiment 2

A configuration of rotary cutting tool 100 according to Embodiment 2 will now be described. A configuration different from that of rotary cutting tool 100 according to Embodiment 1 will be mainly described below, and similar description will not be repeated.

Figure 10:
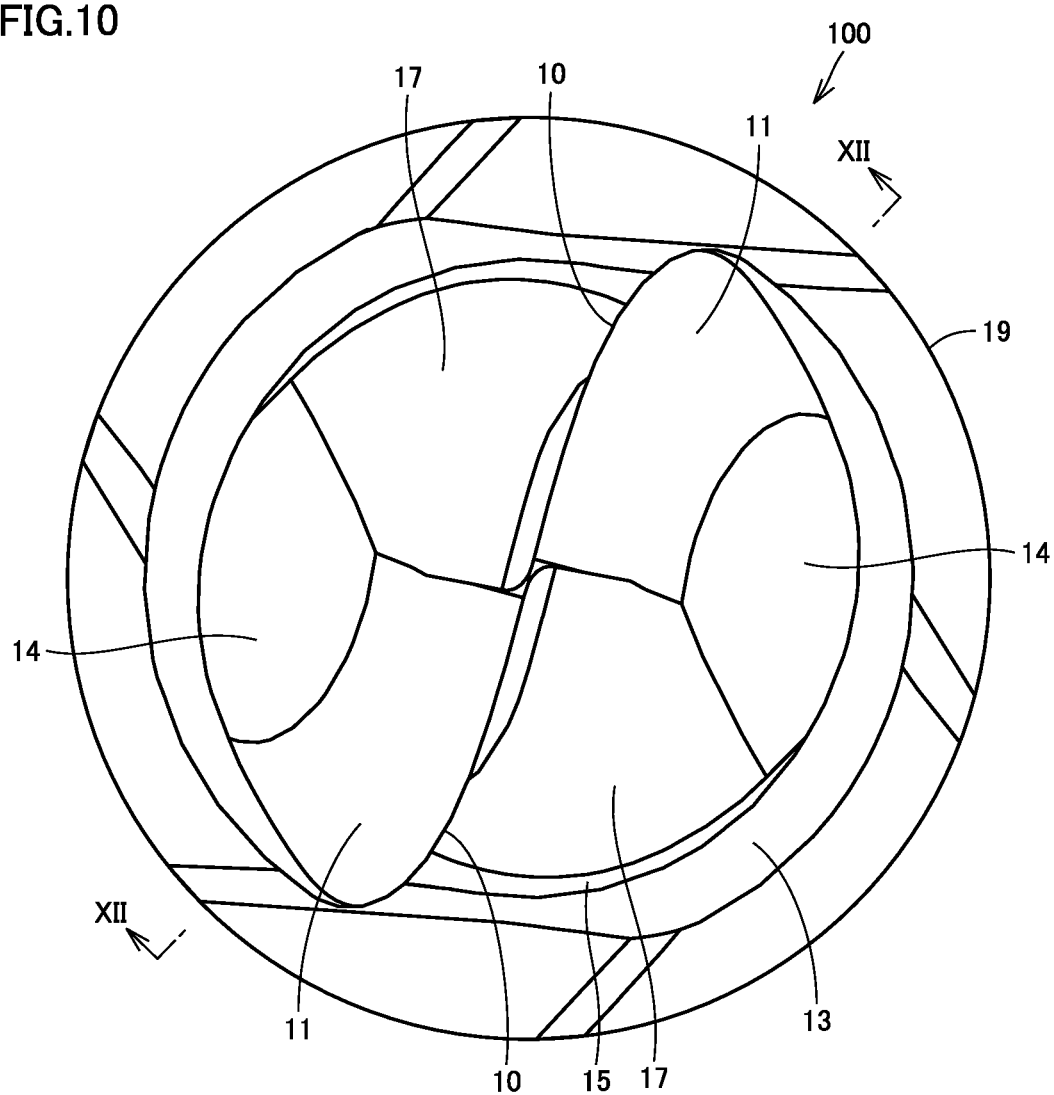
FIG. 10 is a schematic plan view showing a configuration of a rotary cutting tool according to Embodiment 2.
Figure 11:
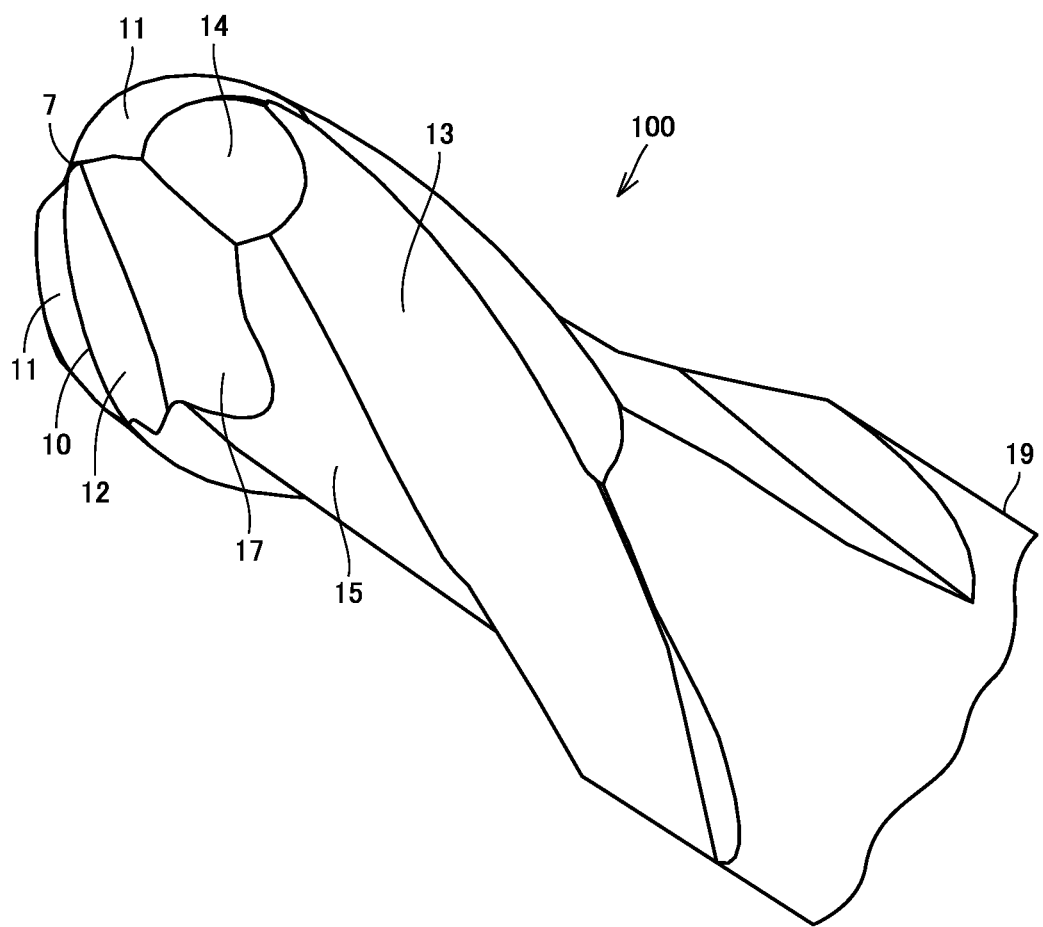
FIG. 11 is a schematic perspective view showing a configuration of the rotary cutting tool according to Embodiment 2.

FIG. 10 is a schematic plan view showing a configuration of a rotary cutting tool according to Embodiment 2. FIG. 11 is a schematic perspective view showing a configuration of a rotary cutting tool according to Embodiment 2. As shown in FIGS. 10 and 11, rotary cutting tool 100 according to Embodiment 2 may be, for example, a ball end mill. Rotary cutting tool 100 mainly has rake face 12, flank face 11, peripheral surface 13, heel face 14, first groove face 15, a second groove face 17, and a shank 19. Flank face 11 is continuous with rake face 12. Peripheral surface 13 is continuous with flank face 11. Peripheral surface 13 has, for example, a spiral shape. Heel face 14 is continuous with flank face 11. Heel face 14 is located rearward of flank face 11 in the direction of rotation. The ridge line between rake face 12 and flank face 11 defines cutting edge 10. Cutting edge 10 may have an arc shape.

First groove face 15 is continuous with second groove face 17. First groove face 15 may be located on the shank 19 side with respect to second groove face 17. First groove face 15 may be located on the outer periphery side with respect to second groove face 17. Second groove face 17 may be continuous with rake face 12, flank face 11, and heel face 14. Peripheral surface 13 may be continuous with flank face 11, heel face 14, and first groove face 15. Peripheral surface 13 may be located on the outer peripheral side with respect to each of flank face 11, heel face 14, and first groove face 15. Heel face 14 may be located on the shank 19 side with respect to flank face 11. Peripheral surface 13 may be located on the shank 19 side with respect to heel face 14.

Figure 12:
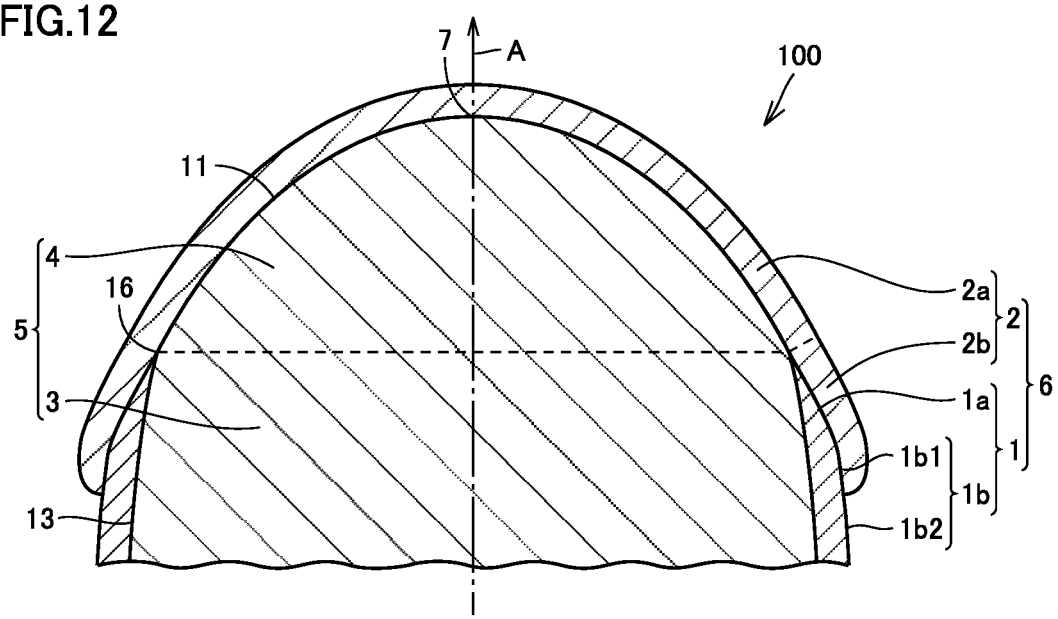
FIG. 12 is a schematic sectional view taken along line XII-XII in FIG. 10.

FIG. 12 is a schematic sectional view taken along line XII-XII in FIG. 10. As shown in FIG. 12, in the cross section including central axis A, head portion 4 may have a shape curving to project toward tip 7. In the cross section, flank face 11 and peripheral surface 13 may have, for example, an arc shape. In the cross section, the radius of curvature of flank face 11 may be smaller than the radius of curvature of peripheral surface 13. In the cross section, the inclination of the tangent of flank face 11 to central axis A may be greater than the inclination of the tangent of peripheral surface 13 to central axis A. As shown in FIG. 12, in the cross section including central axis A, when head portion 4 has a first curve portion (part of flank face 11) having a first radius of curvature and body portion 3 has a second curve portion (part of peripheral surface 13) having a second radius of curvature, greater than the first radius of curvature, to central axis A, shoulder portion 16 is a boundary portion between the first curve portion and the second curve portion.

First diamond layer 1 covers body portion 3 and shoulder portion 16 and exposes head portion 4. First diamond layer 1 covers, for example, peripheral surface 13 of body portion 3. First diamond layer 1 may cover, for example, first groove face 15 and shank 19. First diamond layer 1 exposes, for example, flank face 11 of head portion 4. First diamond layer 1 may expose heel face 14 of head portion 4.

Second diamond layer 2 covers head portion 4 and is provided on first diamond layer 1 in shoulder portion 16. Second diamond layer 2 covers, for example, flank face 11 of head portion 4. Second diamond layer 2 does not cover peripheral surface 13 of body portion 3. Second diamond layer 2 may cover rake face 12, cutting edge 10, heel face 14, and second groove face 17. The rotary cutting tool according to Embodiment 2 can be manufactured by a method similar to that for the rotary cutting tool according to Embodiment 1. The rotary cutting tool according to Embodiment 2 can achieve effects similar to those of the rotary cutting tool according to Embodiment 1.

Embodiment 3

A configuration of rotary cutting tool 100 according to Embodiment 3 will now be described. A configuration different from that of rotary cutting tool 100 according to Embodiment 1 will be mainly described below, and similar description will not be repeated.

Figure 13:
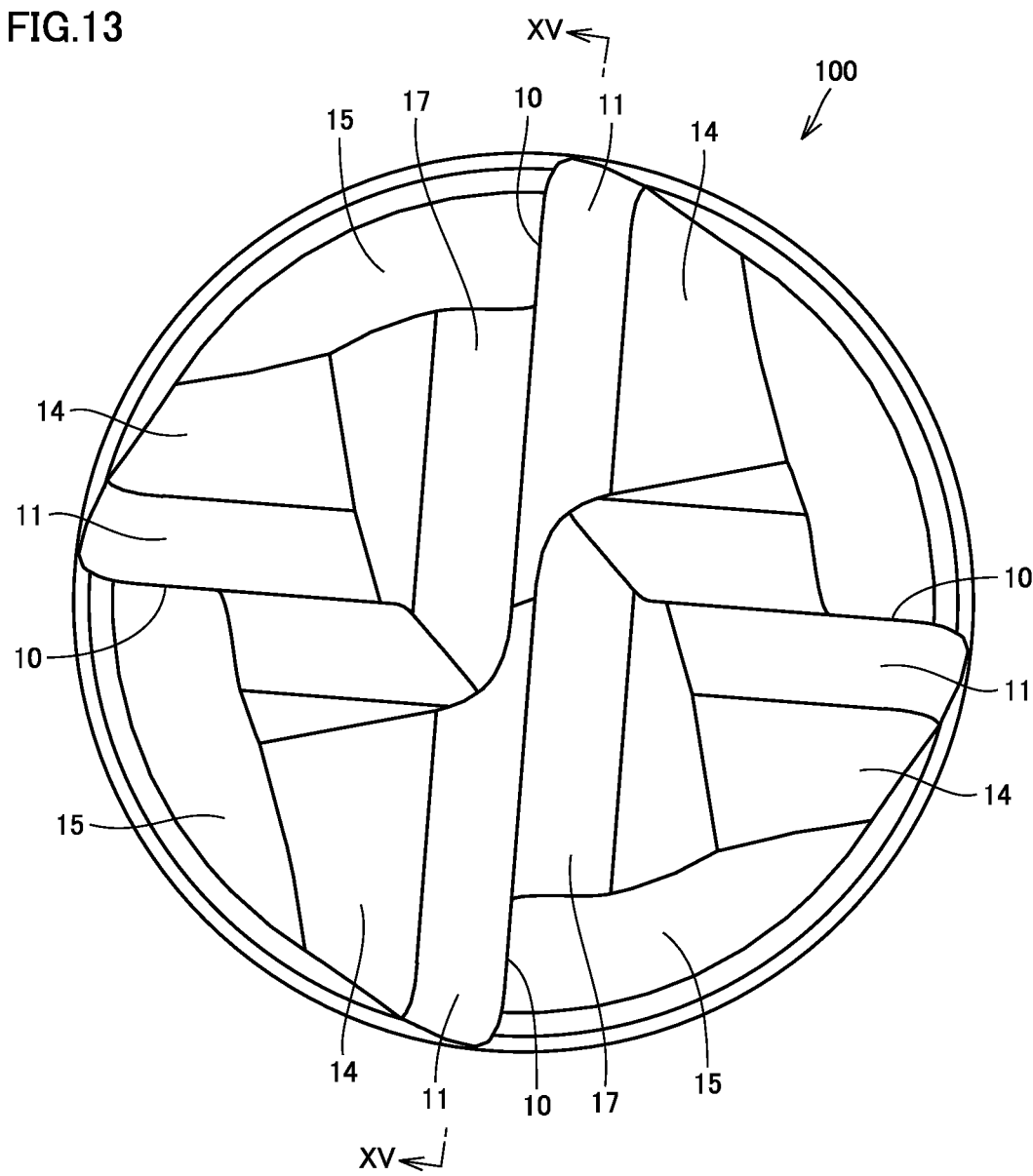
FIG. 13 is a schematic plan view showing a configuration of a rotary cutting tool according to Embodiment 3.
Figure 14:
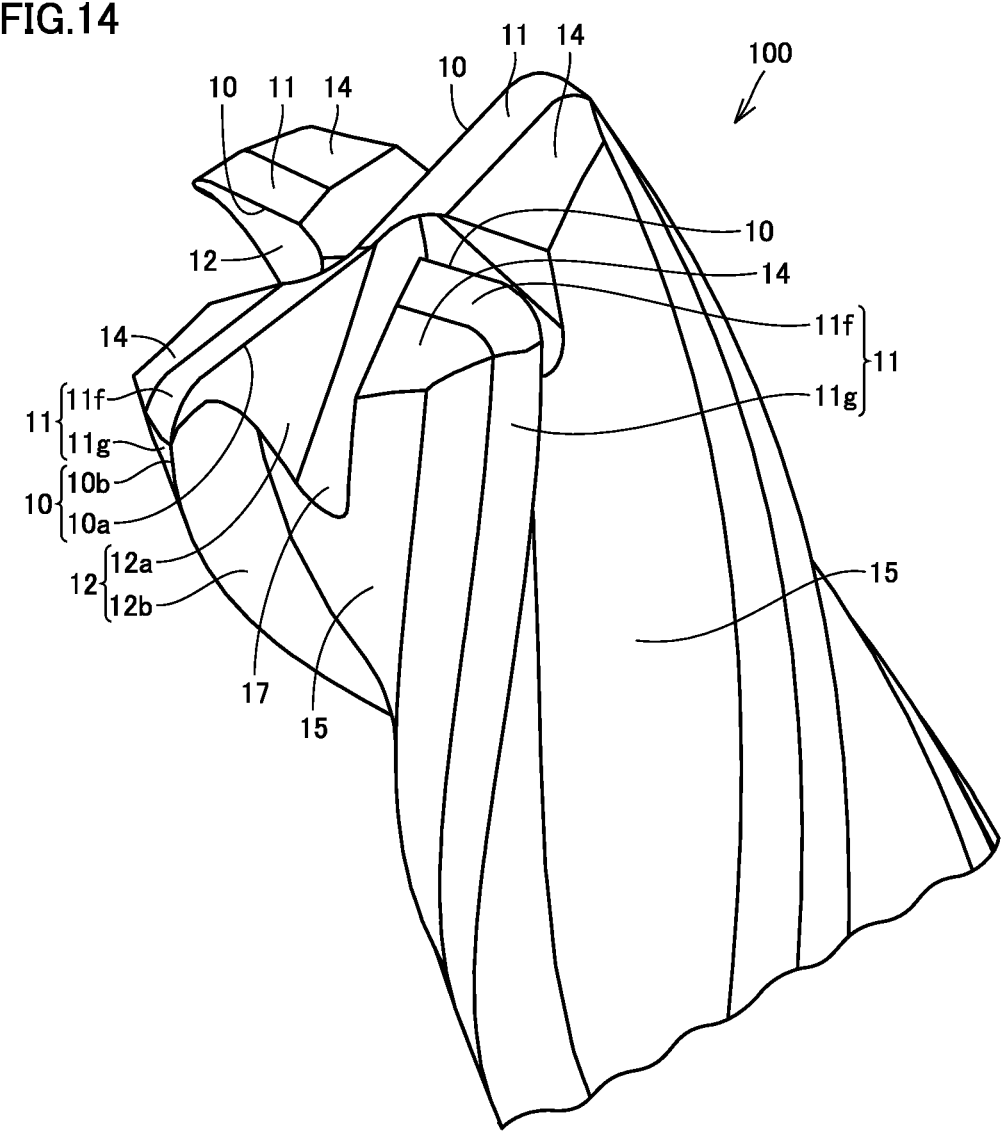
FIG. 14 is a schematic perspective view showing a configuration of a rotary cutting tool according to Embodiment 3.

FIG. 13 is a schematic plan view showing a configuration of a rotary cutting tool according to Embodiment 3. FIG. 14 is a schematic perspective view showing a configuration of the rotary cutting tool according to Embodiment 3. As shown in FIGS. 13 and 14, rotary cutting tool 100 according to Embodiment 2 may be, for example, a radius end mill. Rotary cutting tool 100 mainly has rake face 12, flank face 11, heel face 14, first groove face 15, and second groove face 17. Flank face 11 is continuous with rake face 12. Heel face 14 is continuous with flank face 11. Heel face 14 is located rearward of flank face 11 in the direction of rotation. A ridge line between rake face 12 and flank face 11 defines cutting edge 10.

As shown in FIG. 14, cutting edge 10 may have an end cutting edge 10a and a peripheral cutting edge 10b. Peripheral cutting edge 10b is located on the outer peripheral side with respect to end cutting edge 10a. Flank face 11 may have a sixth flank face portion 11f and a seventh flank face portion 11g. Rake face 12 may have a first rake face portion 12a and a second rake face portion 12b. A ridge line between sixth flank face portion 11f and first rake face portion 12a may define end cutting edge 10a. A ridge line between seventh flank face portion 11g and second rake face portion 12b may define peripheral cutting edge 10b.

First groove face 15 is continuous with second groove face 17. First groove face 15 may be located on the shank 19 side with respect to second groove face 17. First groove face 15 may be located on the outer peripheral side with respect to second groove face 17. Second groove face 17 may be continuous with first rake face portion 12a. Heel face 14 may be located on the shank 19 side with respect to flank face 11.

Figure 15:
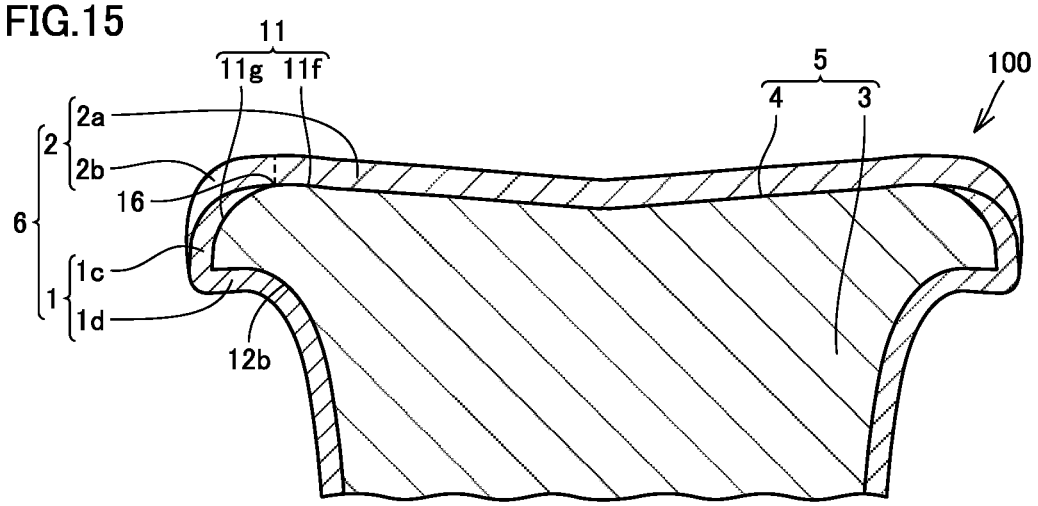
FIG. 15 is a schematic sectional view taken along line XV-XV in FIG. 13.

FIG. 15 is a schematic sectional view taken along line XV-XV in FIG. 13. As shown in FIG. 15, head portion 4 includes, for example, sixth flank face portion 11f. In the cross section including central axis A, head portion 4 may have a linear portion. Head portion 4 may include end cutting edge 10a. Head portion 4 may include heel face 14. Body portion 3 includes, for example, seventh flank face portion 11g. Body portion 3 may include second rake face portion 12b continuous with seventh flank face portion 11g. In the cross section, second rake face portion 12b may curve to project toward the inner periphery. Body portion 3 may include peripheral cutting edge 10b. As shown in FIG. 15, in the cross section including central axis A, when head portion 4 has a linear portion (part of sixth flank face portion 11f) and body portion 3 has a curve portion (part of seventh flank face portion 11g), shoulder portion 16 is a boundary portion between the linear portion and the curve portion.

First diamond layer 1 covers body portion 3 and shoulder portion 16 and exposes head portion 4. First diamond layer 1 covers, for example, seventh flank face portion 11g of body portion 3. First diamond layer 1 may cover, for example, second rake face portion 12b. First diamond layer 1 may cover first groove face 15 and second groove face 17. First diamond layer 1 may cover peripheral cutting edge 10b and expose end cutting edge 10a. First diamond layer 1 exposes, for example, sixth flank face portion 11f. First diamond layer 1 may expose, for example, heel face 14. Second diamond layer 2 covers head portion 4 and is provided on first diamond layer 1. Second diamond layer 2 covers, for example, sixth flank face portion 11f. Second diamond layer 2 does not cover seventh flank face portion 11g of body portion 3. Second diamond layer 2 may cover heel face 14. Second diamond layer 2 may cover end cutting edge 10a. The rotary cutting tool according to Embodiment 3 can be manufactured by a method similar to that for the rotary cutting tool according to Embodiment 1. The rotary cutting tool according to Embodiment 3 can achieve effects similar to those of the rotary cutting tool according to Embodiment 1.

Although Embodiments 1 to 3 have described the cases where the rotary cutting tool is a drill, a boll end mill, and a radius end mill, respectively, the rotary cutting tool is not limited thereto. The rotary cutting tool may be, for example, a reamer. Also, Embodiments 1 to 3 have described the cases where the two diamond layers are provided, the diamond layers are not limited to two layers and may be three or more layers. The rotary cutting tool may have a third diamond layer covering at least one of the first diamond layer and the second diamond layer.

It should be understood that the embodiments disclosed herein have been presented for the purpose of illustration and non-restrictive in every respect. It is intended that the scope of the present invention is not limited to the description above but defined by the scope of the claims and encompasses all modifications equivalent in meaning and scope to the claims.

REFERENCE SIGNS LIST 1 first diamond layer, 1a inclined surface, 1b flat surface, 1b1 first flat surface portion, 1b2 second flat surface portion, 2 second diamond layer, 2a first region, 2b second region, 3 body portion, 4 head portion, 5 base material, 6 diamond layer, 7 tip, 10 cutting edge, 10a end cutting edge, 10b peripheral cutting edge, 11 flank face, 12 rake face, 11a first flank face portion, 11b second flank face portion, 11c third flank face portion, 11d fourth flank face portion, 11e fifth flank face portion, 11f sixth flank face portion, 11g seventh flank face portion, 12a first rake face portion, 12b second rake face portion, 13 peripheral surface, 14 heel face, 15 first groove face (groove face), 16 shoulder portion, 17 second groove face, 19 shank, 20 mask member, 21 end, 100 rotary cutting tool, A central axis, T distance.

The invention claimed is:

1. A rotary cutting tool comprising:
   a base material including a head portion, a body portion, and a shoulder portion defining a boundary portion between the head portion and the body portion;
   a first diamond layer covering the body portion and the shoulder portion and exposing the head portion; and
   a second diamond layer covering the head portion, provided on the first diamond layer in the shoulder portion, and not covering the body portion, wherein
   the first diamond layer has a first main surface and a second main surface opposite to the first main surface,
   the first main surface is in contact with the base material, and
   the second diamond layer is in contact with the second main surface.

2. The rotary cutting tool according to claim 1, wherein the head portion has a flank face, and the second diamond layer covers the flank face.

3. The rotary cutting tool according to claim 1, wherein the body portion has a peripheral surface having a spiral shape, and the first diamond layer covers the peripheral surface.

4. The rotary cutting tool according to claim 1, wherein the rotary cutting tool is a drill.

5. The rotary cutting tool according to claim 1, wherein the rotary cutting tool is an end drill.

* * * * *